Figure 1:
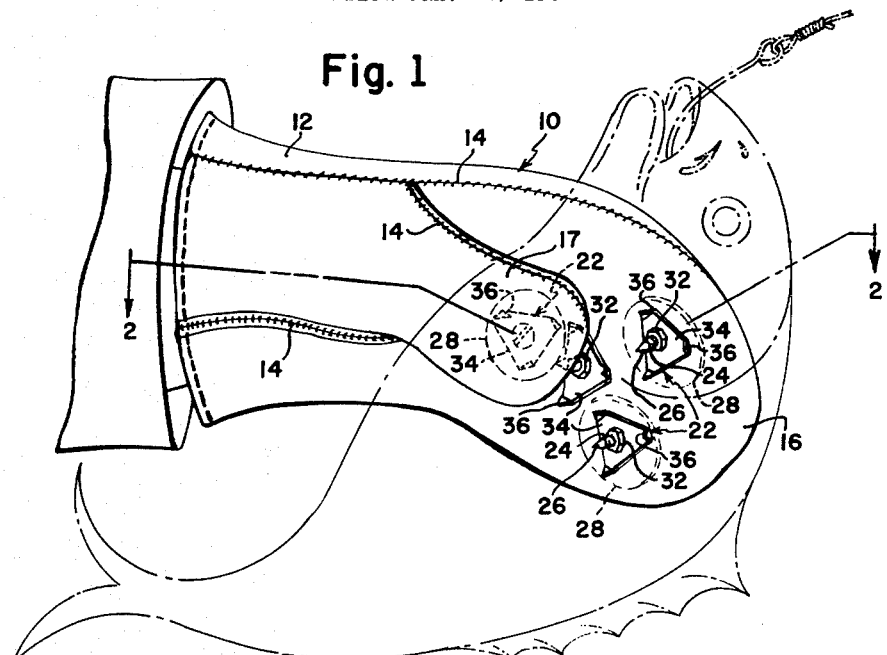

Feb. 22, 1966  S. SHRIER  3,236,553
FISH GRIPPER
Filed Jan. 28, 1964

INVENTOR.
SIDNEY SHRIER
BY *John Cyril Malloy*
ATTORNEY

United States Patent Office 3,236,553
Patented Feb. 22, 1966

3,236,553
FISH GRIPPER
Sidney Shrier, Syracuse, N.Y., assignor to Kebek Industries, Inc., Miami, Fla., a corporation of Florida
Filed Jan. 28, 1964, Ser. No. 340,761
7 Claims. (Cl. 294—25)

This invention relates to an implement for fishermen, and particularly to a manual grip, for holding fish, for instance during the process of extracting a hook. Holding a fish constitutes a problem for several reasons, such as the agility of the fish, and its rounded contours, and slipperiness. Furthermore there is a distinct likelihood of injury to the handler, especially with certain species of fish. Plier-like tools are sometimes employed to hold the fish, but these are awkward in use, and leave much to be desired in the matter of manual coordination.

It is therefore a general object of the invention to provide an improved fish-holding device. Another object is to improve manual coordination in fish-handling. More particularly it is an object to provide a fish-holding device which is worn on the hand. In still greater particular, it is an object to provide a glove-type, or mitten-type holder, having a series of protruding spikes, arranged for application on opposite sides of a fish, in a natural hand grasp. Yet another object is to provide a holder comprising a hand cover with plates having barbs, and secured by spike-like fasteners.

The objects also include provision of a device which is simple of construction, easy of manufacture, and low in cost.

Figure 2:
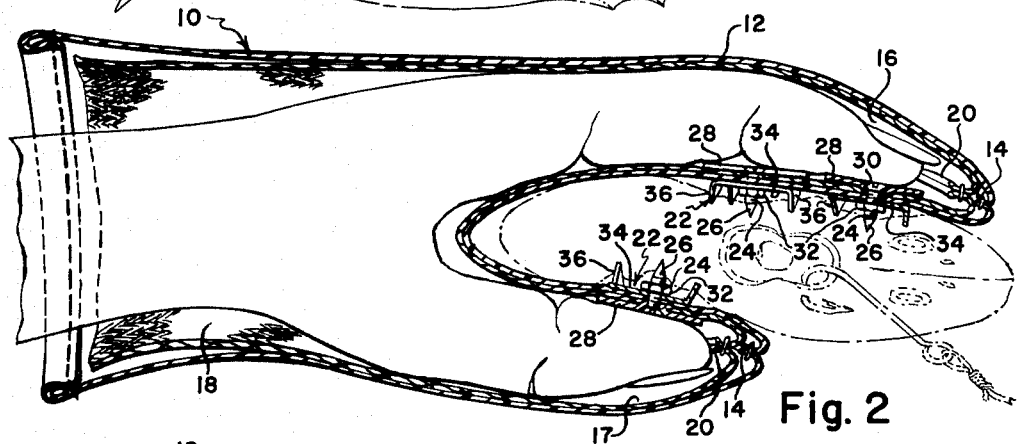
Figure 3:
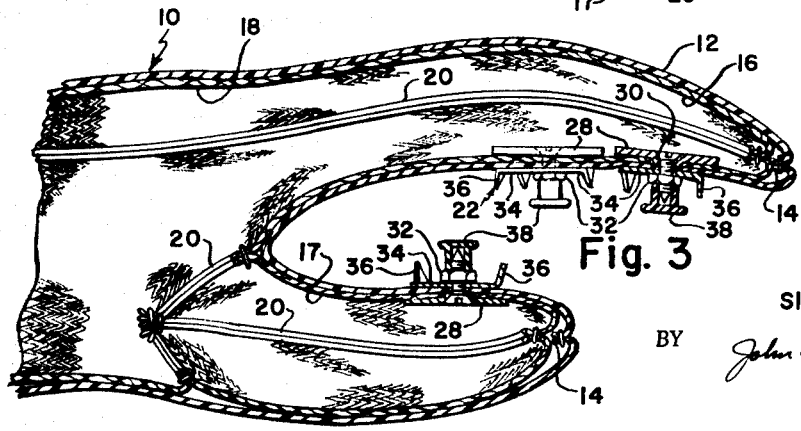

These and other objects, which will be apparent, are attained by the present invention, a preferred form of which is described in the following specification, as illustrated in the drawing, in which:

FIGURE 1 is a perspective view of one type of holder in use, showing a fish in dash lines, FIGURE 2 is a sectional view taken along the planes of the staggered line 2—2 of FIGURE 1, and FIGURE 3 is a view similar to FIGURE 2, showing protective caps on the spikes.

Referring to the drawings by characters of reference there is shown a preferred embodiment, in the form of a mitten 10, with outer covering 12, of rubber or plastic, or other tough material, substantially proof against puncture by fish spines or the like, which, as shown, has inturned seams 14, but which could also be produced in unitary form, as by molding, or electrodeposition. Also, although a mitten is shown, with finger compartment 16, and thumb 17, a full or partial glove may also be employed. For comfort, extra protection, and other reasons, the mitten or glove preferably is provided with an inner liner 18, of cloth or the like, which may also be fabricated with inturned seams 20.

The gripping elements 22, are provided on the inner face of the finger portion (three in the form shown) and on the inner face of the thumb pocket (one) so as to be disposed in opposed relation, on opposite sides of a fish, as shown in FIGURE 1, in the natural grasping action of thumb and fingers. This involves no demands on the brain of the user for coordination, as in the case where a mechanical clamp is employed.

As best seen in FIGURES 2 and 3, the grippers compries a central spike 24, in the form of a screw, with pointed, inner end 26, which screw is passed through the central opening of a washer 28, located within the lining 18, and preferably having an inwardly struck, or skirted periphery 30, acting as a grommet in the openings in the envelope 12 and lining 18. The screw is held in place by a nut 32, overlying a triangular washer 34, the corners of which are turned outwardly, at right angles to form barbs 36. As shown, the barbs 36 are somewhat shallower than spike points 26, and therefore need not be brought into play as grippers, except in cases where more holding power than that afforded by the spikes is required. The extent of this requirement is sensed automatically by the user.

By the use of a device thus described, it will be seen that a fish is easily and quickly reduced to a firmly gripped condition, with little conscious effort on the part of the user. The spikes or barbs prevent all lateral movement of the fish, which usually results in their slipping from the grasp. Also, the provision of grippers in plurality on the finger portion prevents rotary movement, so that the fish is held steady for the necessary operations, such as removal of a hook, stringing on a line, or deposit in a container.

In order to protect the glove or mitten during shipment, or other periods of non-use, the spike points 26 may be covered by caps 38, which may be of metal, with internal threads, or of plastic, and therefore adapted for self-threading.

While a certain, preferred embodiment has been shown and described, various modifications will be apparent, in the light of this disclosure, and the invention should not, therefore, be deemed as limited, except insofar as shall appear from the spirit and scope of the appended claims.

I claim:

1. A fish-handling device comprising a hand-covering with a finger compartment and thumb compartment, and impalement means carried by the inner sides of said compartments in opposed relation, said impalement means comprising, an inner washer, a screw with a pointed outer end passing through said washer, and an outer holding nut on said screw.

2. In a device as in claim 1, an outer washer held by said nut, and having barbs pointed in the direction of the pointed end of said screw.

3. A device as in claim 2, said outer washer being polygonal, and said barbs formed by bent corners thereof.

4. In a device as in claim 1, a protective head threadedly secured on said screw, in covering relation to the pointed end thereof.

5. A device as in claim 2, said pointed ends extending further than said barbs.

6. A device as in claim 1, said inner washer having a peripheral skirt received in the opening in said hand-covering.

7. A mitten-type fish handling device comprising;
 a hand covering with a thumb compartment and a finger compartment, said finger compartment being sized to receive a plurality of fingers, said thumb compartment normally, entirely overlapping said finger compartment;
 each of said compartments having an inner face, the inner face of the thumb compartment normally overlaying one border of the inner face of the finger compartment and extending substantially one-half of the length of the finger receiving compartment as viewed from the supine side of the finger compartment and when the faces of the compartments are in normal opposing relation said compartment inner faces being joined by a crotch extending transversely between said inner faces;
 impalement means on the inner face of each compartment and in substantially direct opposed relationship;
 the impalement means on the inner face of said thumb compartment being adjacent the distal end and responsive to a force exerted by the thumb of a wearer to move it toward the center portion of the face of the finger compartment;

the impalement means of said finger compartment being inwardly of the distal and side edges of said inner face as viewed from the supine side and defining only a central impaling zone of a periphery larger than that of the thumb impaling means and normally substantially underlying the distal end of the thumb compartment; and the said impaling zone of the finger receiving compartment being responsive to movement and forces exerted by a plurality of fingers in the finger compartment so that when the device is flexed to grip a fish nestled in the crotch between the compartments, the fish is adapted to be held securely between the impalement means of the thumb compartment and the finger compartment with the impaling means of the impaling zone of the finger compartment and the impaling means of the thumb compartment being on opposite sides of the fish, said impaling means on said compartments each comprising at least one plate respectively secured on said inner faces of said respective compartments and including peripheral, terminally sharpened barbs each spaced from the other and extending substantially normal to its respective plate, said barbs having side edges extending to their respective plate, and adjacent side edges of adjacent barbs forming an open portion therebetween for preventing the accumulation of foreign matter on said impaling means.

References Cited by the Examiner

UNITED STATES PATENTS

| | | |
|---|---|---|
| 350,248 | 10/1886 | Holman. |
| 730,051 | 6/1903 | Scott. |
| 1,050,479 | 1/1913 | Long _____ 294—82 |
| 1,210,587 | 1/1917 | Benson. |
| 1,243,622 | 10/1917 | Nielsen. |
| 1,423,543 | 7/1922 | Sautter. |
| 1,788,858 | 1/1931 | Canuel _____ 294—25 |
| 2,095,095 | 10/1937 | Howard _____ 36—107 |

GERALD M. FORLENZA, *Primary Examiner.*

SAMUEL F. COLEMAN, HUGO O. SCHULZ,
*Examiners.*

G. F. ABRAHAM, *Assistant Examiner.*